US008369495B1

(12) United States Patent
Mallenahally Channakeshava

(10) Patent No.: US 8,369,495 B1
(45) Date of Patent: Feb. 5, 2013

(54) INTELLIGENT INTERACTIVE VOICE RESPONSE SYSTEM

(75) Inventor: Girish Mallenahally Channakeshava, Bangalore (IN)

(73) Assignee: Intuit Inc., Mountain View, CA (US)

(*) Notice: Subject to any disclaimer, the term of this patent is extended or adjusted under 35 U.S.C. 154(b) by 281 days.

(21) Appl. No.: 12/560,954

(22) Filed: Sep. 16, 2009

(51) Int. Cl.
*H04M 11/00* (2006.01)
*H04M 1/64* (2006.01)

(52) U.S. Cl. .................... 379/88.18; 379/88.23

(58) Field of Classification Search .......... 379/88.01, 379/88.03, 88.23, 201.02, 211.01, 211.02, 379/219; 455/466
See application file for complete search history.

(56) References Cited

U.S. PATENT DOCUMENTS

| | | | |
|---|---|---|---|
| 6,061,433 A * | 5/2000 | Polcyn et al. | 379/93.12 |
| 6,947,539 B2 * | 9/2005 | Graham et al. | 379/219 |
| 7,012,996 B2 * | 3/2006 | Polcyn | 379/88.01 |
| 7,065,188 B1 * | 6/2006 | Mei et al. | 379/88.23 |
| 2003/0112942 A1 * | 6/2003 | Brown et al. | 379/196 |
| 2003/0198321 A1 * | 10/2003 | Polcyn | 379/88.01 |
| 2007/0073719 A1 * | 3/2007 | Ramer et al. | 707/10 |
| 2007/0100650 A1 * | 5/2007 | Ramer et al. | 705/1 |

* cited by examiner

*Primary Examiner* — Mohammad Islam
(74) *Attorney, Agent, or Firm* — Vista IP Law Group LLP; Gary D. Lueck

(57) ABSTRACT

An interactive voice response system takes into account current and/or historical call data in determining navigation logic for a specific call.

55 Claims, 3 Drawing Sheets

INTELLIGENT INTERACTIVE VOICE RESPONSE SYSTEM

BACKGROUND

The invention relates to interactive voice response (IVR) units that accept a combination of voice and/or touch tone inputs, and in response navigate the caller through menu options using pre-recorded messages. Such systems are well-known in general, but known systems do not alter the navigation logic based on current and/or historical call data. Thus, the same navigation logic is used for all callers, all the time, without taking into account any current and/or historical call data.

SUMMARY

In one aspect of the present invention, an IVR system receives a call from a caller, identifies a profile associated with the caller, determines a preferred navigation menu to implement for the call based on 1) current call data and 2) historical call data associated with the profile, and implements the preferred navigation menu for the call. The preferred navigation menu includes navigation logic to route the call to the target menu option via the IVR system.

The profile is identified by matching data from the call or caller to corresponding data in a profile database. The data from the call may be the caller's phone number, a password, or biometric data such as voice recognition. The current call data used for determining the preferred navigation menu may include calendar data, location data, menu selection data, and/or the caller's phone number. The historical call data may include data gathered during a previous call or calls from the caller, and/or from one or more other callers, menu selection data, and/or data associated with one or more other profiles linked to the first profile through one or more links.

When the preferred navigation menu is implemented, the system may place forced menu options ahead of other menu options. During the call, new call data may be gathered and added to the profile database to update the historical call data for the caller's profile and/or other individual or general profiles. The new data may include location data, customized menu options, calendar data, biometric data, menu selection data, and/or phone number data.

In another aspect of the invention, an IVR system receives a call from a caller, identifies a location of the caller, and implements a preferred navigation menu for the call based upon the location of the caller. The preferred navigation menu includes navigation logic to route the call to a target menu option. The location of the caller may be determined based on the area code of the caller's phone being used, GPS-based technology, or other data from the caller's profile such as home address, zip code, or other relevant geographic area. The preferred navigation menu may also be determined in this case based in part on historical call data associated with the caller's profile.

BRIEF DESCRIPTION OF THE DRAWINGS

The foregoing and other aspects of embodiments are described in further detail with reference to the accompanying drawings, wherein.

DETAILED DESCRIPTION OF ILLUSTRATED EMBODIMENTS

An IVR system in accordance with the present invention takes into account current and/or historical call data in determining navigation logic for a specific call. Doing so allows the IVR system to be more efficient with the caller by presenting the caller with menu options in a sequence more likely to get the caller to the caller's target option than if a fixed navigation menu was used.

Figure 1:
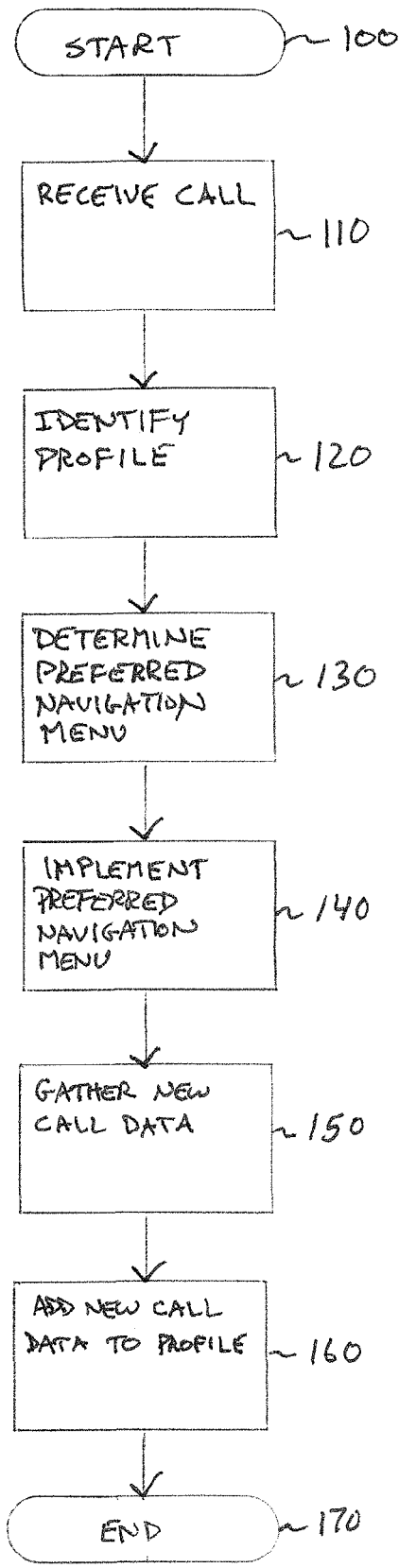
FIG. 1 is a flow diagram of a method of using an IVR system to route a call to a target menu option according to one embodiment of the present invention.

Turning to FIG. 1 (and with reference also to FIG. 3), a flow diagram is shown of a method according to one embodiment of the present invention. In general, the process begins at step 100, and at step 110 the IVR system receives a call from a caller. At step 120, the IVR system then identifies a profile associated with the caller. Based on current call data, and historical call data associated with the profile, at step 130 the IVR system then determines a preferred navigation menu to implement for the call, and at step 140 implements the preferred navigation menu for the call. During the call, new call data may be gathered and added to the profile database to update the historical call data for the caller's profile and/or other individual or general profiles. This is shown at steps 150 and 160, although the process of gathering new call data and adding the new call data to profiles may occur at any time as early as when the call is received all the way through the end of the call and even after the call has ended. The steps of FIG. 1 will now be described in more detail.

Figure 3:
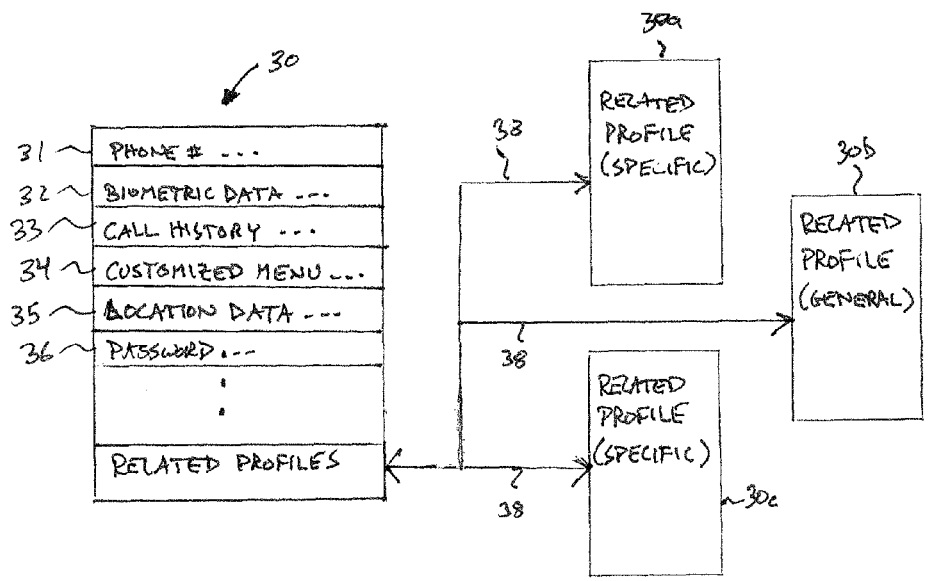
FIG. 3 illustrates a database record layout of a profile record according to one embodiment of the present invention.

At step 110, a call is received as is well-known in the art at a call center, public telephone switching network, or the like. At step 120, the profile is identified by matching data from the call to corresponding data in a profile database. The data from the call may be the caller's phone number, a password, biometric data such as a voice sample, or a combination of the aforementioned. A sample record 30 of a profile database is shown in FIG. 3. The profile record 30 shows fields for phone numbers 31, biometric data 32, and passwords 36. Thus in this example, the target profile may be identified from multiple profile records in the database by matching the caller's phone number to a phone number 31 in the target profile record 30, and/or by requesting the caller to input additional data such as a password and/or biometric data (e.g., a voice sample, or even a fingerprint via a suitable input device), to be matched to a password 36 or biometric data 32 in the target record 30. If no profile is identified as a match, then the IVR system may use a default starting navigation menu for the call, and create a new profile for future use using call data from the current call. If multiple profiles are identified, the IVR system may select one using random or simple sequential selection logic, or more sophisticated selection logic based on current and/or historical call data.

Presuming a single profile is identified, or if multiple profiles are identified then a single profile is selected, the IVR system then determines a preferred navigation menu at step 130. This determination may be as simple as selecting a customized menu 34 already associated with the selected profile 30. Such a customized menu 34 may have been previously created by the caller, the IVR system, or another party. If there is no customized menu 34 associated with the identified profile 30, then the IVR system determines a navigation menu. To do so, the IVR system uses current call data and/or historical call data. Current call data may include calendar data, location data, menu selection data, and/or the caller's phone number. Historical call data may include data gathered during a previous call or calls from the caller, and/or from one or more other callers, menu selection data, and/or data associated with another profile (30a, 30b, 30c) linked to the first profile through one or more links 38.

With respect to calendar data, this may be a day of the week, day of the month, day of the year, time of day, month, season, and/or ranges of any of the aforementioned, or a specific date or time in relation to an event, such as an ad that just aired. Thus for example, if a call comes in to a catalog sales company on a specific day of the year or within a certain range close to a known date such as a birth date or anniversary date associated with the profile record 30, or a known holiday date, the IVR system may determine the first menu option should be for purchasing a special gift as opposed to checking on a previous order or seeking help for accessing the company's Internet site. If a call comes in to a financial institution after business hours, the IVR system may determine the first menu option should be for inquiring as to balance.

With respect to location data 35, this can be a zip code, a GPS-based location, a home address, and/or other relevant geographic area data associated with the call or caller. Thus, for example, if a call comes in to a utility company from a caller with a certain zip code or home address in the identified profile record 30, the IVR system may determine the first menu option should be a notification of an unscheduled power outage currently existing in that area. Likewise, if the call comes in to the U.S. Geological Survey office from a caller whose GPS-identified location is in the proximity of a recent earthquake, the IVR system may determine the first menu option should be to obtain information about said recent earthquake. Geographic area data may be based on any geographic boundaries from a single address, to a street, neighborhood, city, town, county, state, region, time zone, cell, continent, country, etc., or any combination of multiple such geographic areas and/or such geographic area data metrics.

With respect to menu selection data, this is data representing the caller's menu selection options during the current call. For example, if a caller continues to press or say zero, the IVR system may jump directly to a live operator; however, this example reflects what may simply be designed into the original navigation menu.

With respect to the caller's phone number, this of course may be used to identify the profile in the first instance, and in this sense this current call data is used to determine the preferred navigation menu because the profile may contain additional information to be used for this purpose.

Turning now to historical call data 33, this data may be stored in any well-known or other format. It is represented in FIG. 3 as simply call history 33, but the data structures and/or organization may vary according to a specific implementation. This call history 33 may include not only which menu selections have been chosen by the caller in the past, but also relationships of this data to other data such as the various current and historical call data elements discussed herein. For example, the call history may include data indicating the caller frequently selects option 1 when calling at night, but option 2 when calling during business hours. Likewise, the data may reflect the caller frequently selects option 3 (status of pending order) if the call comes in within a certain time (e.g., a few days) after an order has been placed. In such cases, the IVR system may place the frequently chosen options for the given set of circumstances at the front of the navigation menu.

The historical call data may also include data from callers other than the current caller. For example, perhaps most callers within a certain geographical area (which may be the entire universe of callers) typically select option 3, or most callers within a given calendar data metric or other metric which applies to the profile record 30 select option 3, in which case the IVR system may determine option 3 should be presented first. Also, historical call data may be used from one or more other profiles (30a, 30b, 30c) linked to the profile 30 based on relationships such as friend, family, business, location data, etc. The relationships may be caller-selected, user-selected (i.e., by another caller), or IVR system-generated (e.g., based on common profile attributes such as address).

Thus, examples have been described in which the IVR system uses current and/or historical call data to determine a preferred navigation menu, as reflected generally at step 130 of FIG. 1. Although the examples include determining only which option to place first in the navigation menu, the same principles may be used to determine the hierarchy or sequence of an entire navigation menu. And even if only a portion of the hierarchy may be determined in this way, the remainder may be determined by default, random selection, or use of other selection algorithms, the goal being that in many instances the menu selection process will be significantly reduced simply by altering only the first one or two available options to be what the caller is likely to select.

Figure 4:
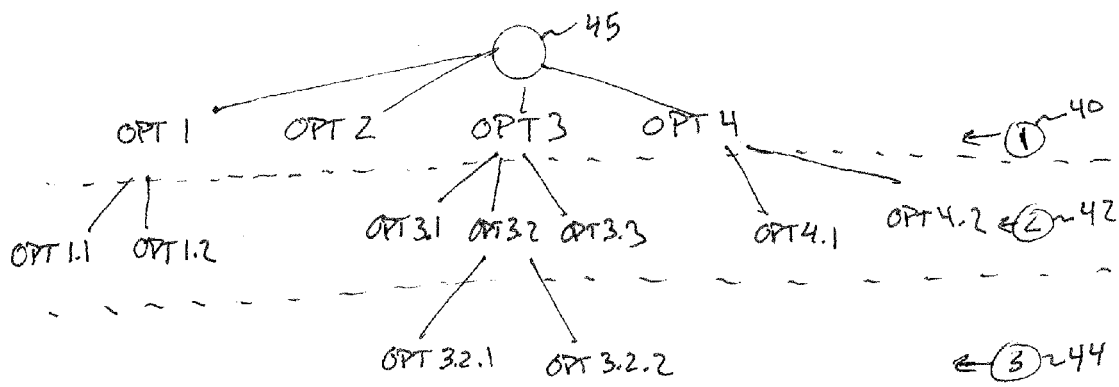
FIG. 4 is a tree diagram illustrating an organizational structure of a typical IVR system navigation menu.
Figure 5:
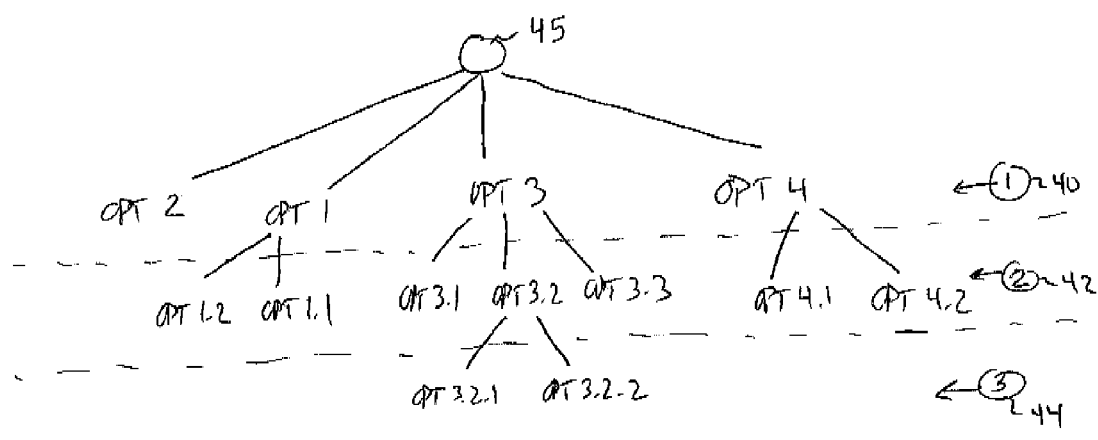
FIG. 5 shows a tree diagram of the navigation menu of FIG. 4 rearranged into a preferred navigation menu in accordance with the present invention.

Continuing with the description of FIG. 1, after the preferred navigation menu is determined, the menu is implemented at step 140. This means the preferred menu is actually used by the IVR system to interact with the caller. For illustration, a sample navigation menu implementation is shown in FIG. 4, which includes three levels of options—level 1 (40), level 2 (42) and level 3 (44). This is shown as a simple tree structure in which the root is at 45 where the IVR system initially presents the caller with options 1, 2, 3, or 4 in that order. If the caller chooses option 1, then the caller is presented with options 1.1 then 1.2 in that order, etc. Typically, the caller may navigate back up the tree by pressing a certain key or saying a certain command, or back to the root by pressing a certain key or saying a certain command. An object of the present invention is for the IVR to rearrange a default navigation menu (such as shown in FIG. 4) so that the options are presented in a more efficient manner based on current call data and/or historical call data. Using the sample tree hierarchy of FIG. 4, this may involve rearranging various menu options from various levels. As an example, FIG. 5 shows the tree diagram of the navigation menu of FIG. 4, rearranged into a preferred navigation menu in which option 2 has been placed as the first option in level 1 (40), and option 1.2 has been placed as the first option off of option 1 in level 2 (42). When rearranging options to create a preferred navigation menu, the IVR system may even "renumber" the options so the caller will always hear "press or say 1" for the first option, "press or say 2" for the second option, etc., even though the options are rearranged.

For example, referring to the default navigation menu of FIG. 4, and the preferred navigation menu of FIG. 5, presume the IVR system is implemented for a financial institution providing financial services via the Internet. The default options (in FIG. 4) may be:

OPT 1="If you are having trouble logging on, press 1";
OPT 1.1="If you are receiving an error message, press 1";

OPT 1.2="If you forgot your password, press 2";
OPT 2="For balance and recent activity, press 2".

But based on current and/or historical call data, the IVR system has generated and implemented the preferred navigation menu of FIG. 5 for a particular caller, and renumbered the options accordingly. When the caller calls, the preferred options (in FIG. 5) could now be:

OPT 2="For balance and recent activity, press 1";
OPT 1="If you are having trouble logging on, press 2";
OPT 1.2="If you forgot your password, press 1";
OPT 1.1="If you are receiving an error message, press 2".

In this manner, the caller is presented with a preferred navigation menu, and the options have been "renumbered" so the numbers for the caller to "say or press" will be presented in a pleasing numerically sequential order.

One aspect of determining a preferred navigation menu includes the IVR system forcing certain menu options ahead of others for reasons unrelated to predicting or anticipating the caller's likely target option. For example, vital menu options (such as 911 emergency) or management-desired menu options (such as ads, special sales, legal disclaimers) may be placed ahead of the menu options that otherwise might be the caller's target option.

During the call, new call data may be gathered and added to the profile database to update the historical call data for the caller's profile and/or other individual or general profiles. This is shown at steps 150 and 160 respectively. The new data may include any data, including the types of data discussed herein such as location data, customized menu options, calendar data, biometric data, menu selection data, and/or phone number data. Although these steps are shown in FIG. 1 after step 140, in practice these steps 150 and 160 may be performed at any time from when the call is first received up to when the call ends, and in some cases even after the call ends. The new call data may be gathered automatically, such as by determining a GPS-location of the caller, the caller's phone number, the calendar data, and even biometric voice data. In addition or alternatively, the new call data may be gathered interactively, such as by the IVR system prompting the caller to enter a password, voice or fingerprint sample, customized menu options, an account number, or even a phone number (e.g., if the number is not readily accessible to the IVR system due to caller-ID blocking), and other data. This interactive process may also include the IVR system recommending certain paths for the caller's preferred navigation menu. Any of the data may also be provided through other means such as an Internet website interface, a live operator, remote date entry (e.g. from a cell phone or PDA), or third party data entry (e.g., based on forms previously provided to the company controlling the IVR system). The data is added to the caller's profile in any suitable manner, including manners known in the art to update databases. In addition, the IVR system may update related records, including individual profile records and group profile records (e.g., records that track historical call data based on groups of callers associated by location data, calendar data, etc.). The process ends at step 170.

Figure 2:
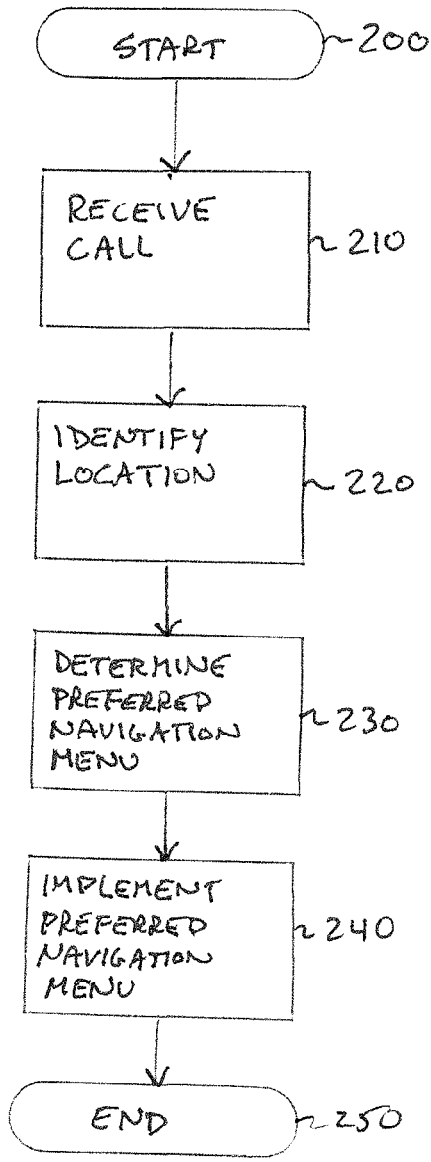
FIG. 2 is a flow diagram of a method of using an IVR system to route a call to a target menu option according to one embodiment of the present invention.

Turning now to FIG. 2, a flow diagram is shown of a method according to one embodiment of the present invention. In general, the process begins at step 200, and at step 210 the IVR system receives a call from a caller. At step 220, the IVR system identifies a location of the caller. Based on the identified location (and optionally also based on current call data, and/or historical call data associated with the profile), at step 230 the IVR system then determines a preferred navigation menu to implement for the call, and at step 240 implements the preferred navigation menu for the call. The steps of FIG. 2 will now be described in more detail.

At step 210, a call is received by the IVR system as described herein with respect to step 110 of FIG. 1. At step 220, the location of the caller is identified in any of a variety of ways, including ways described elsewhere herein. For example, if a profile is identified for the caller, then the location data may be extracted from the profile. The location may also be identified through interaction with the caller during the call, such as via touch tone or voice commands, or by cross-referencing or looking up the area code of the caller's phone. For a precise location, the location data may be determined using GPS-based technology including triangulation or other known or later-developed methods. Once the location is identified, a preferred navigation menu is determined at step 230, then implemented for the call at step 240 to route the call to a target menu option. Thus in this embodiment, determination of the navigation menu is based primarily on location data, and the location data may take priority over other data in the caller's profile. Some examples of when this would be beneficial include when the call is to an emergency services entity or insurance agency and is coming from an area where a known natural disaster has just occurred, so that the IVR system may present the first option as "press or say 1 if you are calling about the recent natural disaster." Another example is when a targeted ad campaign is being executed in the area, so the IVR system may present the first option as "If you are calling about the red-tag special you just saw on TV, press 1." The entire preferred navigation menu in these cases may be determined based in part on the location data, and in part on current call data and/or historical call data associated with the caller's profile. In this manner, although the first option will be presented due to a likelihood or expectation the caller will select the first option, for those callers who do not select the first option, at least the remainder of the navigation menu options may still be organized in a more efficient manner than if the invention was not implemented in the IVR system.

Methods have thus been described for an interactive voice response system that takes into account current and/or historical call data in determining navigation logic for a specific call. Accordingly, embodiments are intended to exemplify alternatives, modifications, and equivalents that may fall within the scope of the claims. For example, the methods described herein may be implemented in a variety of telephone networks, in combination with a variety of GPS-based technologies and using programmable or newly-developed IVR software, firmware, and/or hardware. Also, the invention may be implemented for use in any industry, including but not limited to banking, sales, education, software implementation, healthcare, government, legal, accounting, etc.

What is claimed is:

1. A computer-implemented method of using an interactive voice response system to route a call to a target menu option, the method being performed by a computing apparatus and comprising:
   receiving a current call from a current caller;
   identifying a profile associated with the current caller and an initial navigation menu for the current call;
   determining a preferred navigation menu to implement for the current call, the preferred navigation menu comprising call menu options of the initial navigation menu that can be selected by the current caller and rearranged into a different sequence and renumbered compared to the initial navigation menu, the rearrangement and renumbering being based at least in part upon current call data and historical call data associated with the profile, the historical call data comprising data gathered during another call of at least one other caller within the same geographic area as the current caller and data indicating how the at least one other caller navigated the initial navigation menu; and implementing the preferred navigation menu for the current call, wherein the preferred navigation menu includes navigation logic to route the current call to the target menu option via the interactive voice response system.

2. The method of claim 1, wherein the historical call data further comprises data gathered during a previous call from the current caller.

3. The method of claim 2, wherein the historical call data further comprises menu selection data.

4. The method of claim 1, wherein implementing the preferred navigation menu further comprises implementing a forced menu option ahead of other menu options.

5. The method of claim 1, further comprising:
gathering new call data from the current call, and
adding the new call data to the profile during the current call to update the historical call data.

6. The method of claim 5, wherein gathering new call data further comprises gathering location data.

7. The method of claim 5, wherein gathering new call data further comprises gathering customized menu options.

8. The method of claim 5, wherein gathering new call data further comprises gathering calendar data.

9. The method of claim 5, wherein gathering new call data further comprises gathering biometric data.

10. The method of claim 5, wherein gathering new call data further comprises gathering menu selection data.

11. The method of claim 1, wherein the current call data comprises calendar data.

12. The method of claim 1, wherein the current call data comprises a location associated with the current caller.

13. The method of claim 1, wherein the current call data comprises a phone number associated with the current caller.

14. The method of claim 1, wherein the current call data comprises menu selection data.

15. The method of claim 1, wherein identifying the profile further comprises matching biometric data from the current caller to biometric data in the profile.

16. The method of claim 1, wherein determining the preferred navigation menu is further based on historical call data associated with another profile of the at least one other caller that is linked to the current caller profile.

17. The method of claim 1, further comprising identifying a location of the current caller, and wherein implementing the preferred navigation menu is further based at least in part upon the location of the current caller.

18. The method of claim 1, wherein the target menu option in the initial navigation menu is renumbered to be a different numbered menu option in the preferred navigation menu.

19. The method of claim 17, the location being a GPS-based location of the current caller, the rearrangement and renumbering of the initial navigation menu being based at least in part upon the GPS-based location.

20. The method of claim 19, wherein identifying the GPS-based location of the current caller comprises identifying a zip code associated with the current caller.

21. The method of claim 19, wherein identifying the GPS-based location of the current caller comprises determining the current caller is within a relevant geographic area.

22. The method of claim 1, the historical call data further comprising respective historical data gathered from a plurality of other calls from respective other callers indicating how respective other callers navigated the initial navigation menu.

23. The method of claim 1, the historical data further comprising data of at least one other profile of at least one other caller that is linked to the profile of the current caller for whom the preferred navigation menu is determined.

24. The method of claim 23, the at least one other profile comprising a profile of a friend of the current caller including data indicating how the current caller's friend navigated the initial navigation menu.

25. The method of claim 24, the current caller selecting the at least one other profile of the friend.

26. The method of claim 23, the at least one other profile comprising a profile of a family member of the current caller including data indicating how the current caller's family member navigated the initial navigation menu.

27. The method of claim 25, the current caller selecting the at least one other profile of the family member.

28. The method of claim 23, the at least one other profile comprising a profile of another caller linked to or with which the current caller has a relationship and identified based at least in part upon the location of the other caller, the at least one other profile comprising data indicating how the other caller with which the current caller has the relationship navigated the initial navigation menu.

29. The method of claim 23, the at least one other profile comprising a profile of a business associated with the current caller.

30. The method of claim 1, the current call data comprising menu selection data.

31. The method of claim 1, identifying the profile further comprising matching biometric data from the current caller to biometric data in the profile.

32. The method of claim 1, wherein determining the preferred navigation menu is further based on historical call data associated with another profile of the at least one other caller that is linked to the current caller profile.

33. The method of claim 1, further comprising identifying a location of the current caller, and wherein implementing the preferred navigation menu is further based upon the location of the current caller.

34. The method of claim 1, wherein the target menu option in the initial navigation menu is renumbered to be a different numbered menu option in the preferred navigation menu.

35. The method of claim 33, the location being a GPS-based location of the current caller, the rearrangement and renumbering of the initial navigation menu being based at least in part upon the GPS-based location.

36. The method of claim 35, identifying the GPS-based location of the current caller comprising identifying a zip code associated with the current caller.

37. The method of claim 35, identifying the GPS-based location of the current caller comprising determining the current caller is within a relevant geographic area.

38. A computer-implemented method of using an interactive voice response system to route a call to a target menu option, the method being performed by a computing apparatus and comprising:
receiving a current call from a current caller;
identifying a profile associated with the current caller and an initial navigation menu for the current call;
determining a preferred navigation menu to implement for the current call, the preferred navigation menu comprising call menu options of the initial navigation menu that can be selected by the current caller and rearranged into a different sequence and renumbered compared to the initial navigation menu, the rearrangement and renumbering being based at least in part upon current call data and historical call data associated with a profile of the current caller, the historical call data comprising data gathered during another call of at least one other caller with which the current caller has a relationship based at least in part upon a location of the at least one other caller and data of at least one other profile of the at least one other caller that is linked to the current caller profile, the at least one other profile comprising data indicating how the at least one other caller navigated the initial navigation menu; and implementing the preferred navigation menu for the current call, wherein the preferred navigation menu includes navigation logic to route the current call to the target menu option via the interactive voice response system.

39. The method of claim 38, the at least one other profile comprising a profile of a business associated with the current caller.

40. The method of claim 39, the historical call data further comprising data gathered during a previous call from the current caller.

41. The method of claim 40, the historical call data further comprising menu selection data.

42. The method of claim 39, wherein implementing the preferred navigation menu further comprises implementing a forced menu option ahead of other menu options.

43. The method of claim 39, further comprising gathering new call data from the current call, and adding the new call data to the current caller profile during the current call to update the historical call data.

44. The method of claim 43, wherein gathering new call data further comprises gathering location data.

45. The method of claim 43, wherein gathering new call data further comprises gathering customized menu options.

46. The method of claim 43, wherein gathering new call data further comprises gathering calendar data.

47. The method of claim 43, wherein gathering new call data further comprises gathering biometric data.

48. The method of claim 43, wherein gathering new call data further comprises gathering menu selection data.

49. The method of claim 39, wherein the current call data comprises calendar data.

50. The method of claim 39, the current call data comprising a location associated with the current caller.

51. The method of claim 39, the current call data comprising a phone number associated with the current caller.

52. The method of claim 39, the at least one other profile comprising a profile of a friend of the current caller including data indicating how the current caller's friend navigated the initial navigation menu.

53. The method of claim 52, the current caller selecting the at least one other profile of the friend.

54. The method of claim 38, the at least one other profile comprising a profile of a family member of the current caller including data indicating how the current caller's family member navigated the initial navigation menu.

55. The method of claim 54, the current caller selecting the at least one other profile of the family member.

* * * * *